July 5, 1938. W. W. PAGET 2,122,656
AIR COMPRESSOR UNIT
Filed Aug. 2, 1935
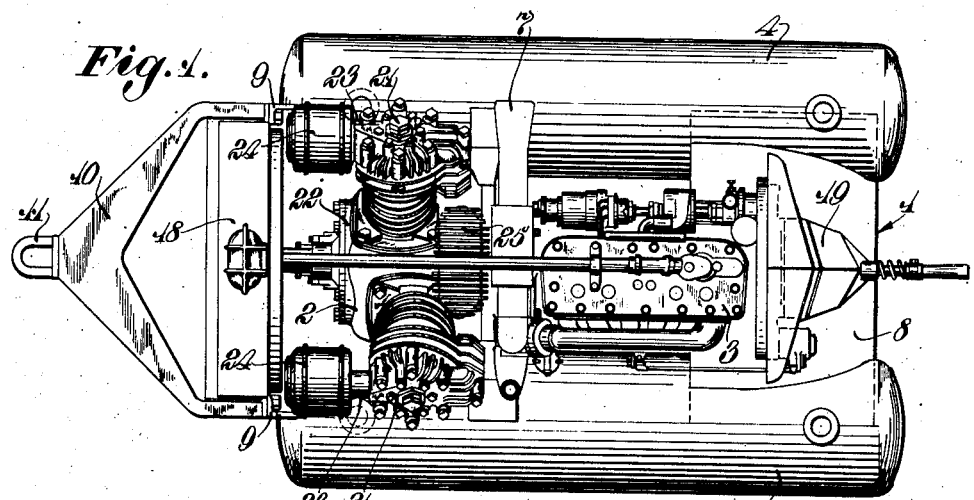
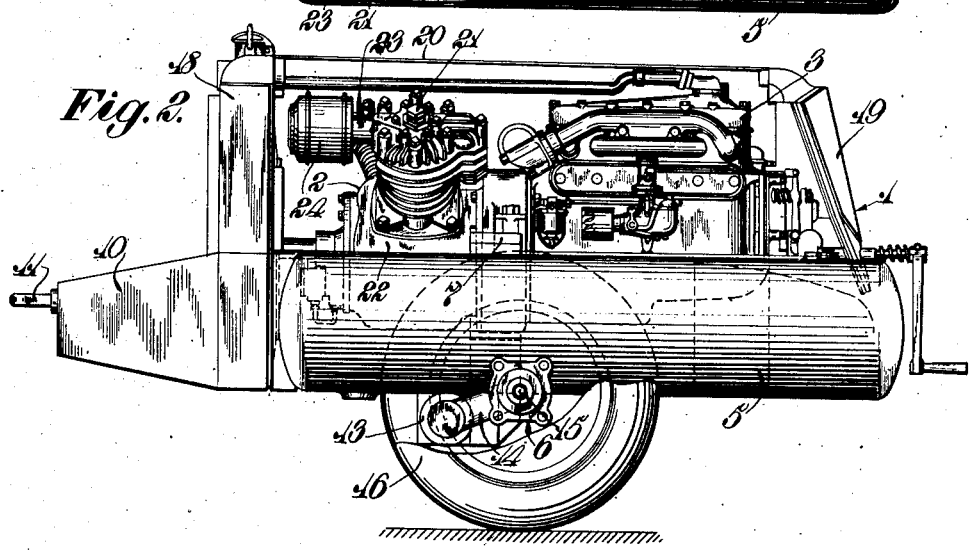
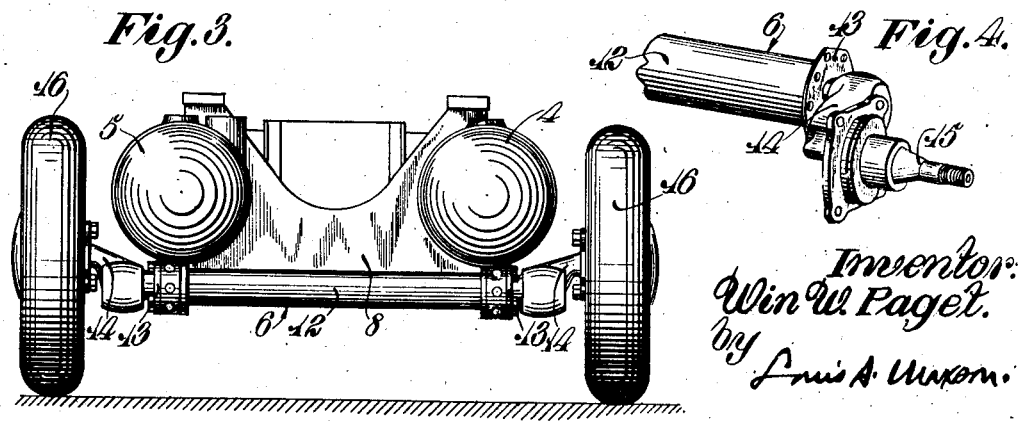
Inventor:
Wm. W. Paget.
by
Louis A. Uxxxon.
Att'y.

Patented July 5, 1938

2,122,656

UNITED STATES PATENT OFFICE 2,122,656

AIR COMPRESSOR UNIT

Win W. Paget, Michigan City, Ind., assignor to Sullivan Machinery Corporation, a corporation of Massachusetts Application August 2, 1935, Serial No. 34,414

3 Claims. (Cl. 230—235)

This invention relates to a compressor unit, and more particularly, but not exclusively, to improvements in a portable air compressor unit of the trailer type adapted to be towed from place to place.

An object of this invention is to provide an improved air compressor unit having a novel arrangement of parts. Another object is to provide an improved portable air compressor unit of the trailer type having the parts thereof arranged in an improved manner to obtain a nicety in balance. A further object is to provide an improved portable supporting structure for the air compressor and its driving engine. Yet another object is to provide an improved underslung axle mounting structure for an air compressor unit of the portable type. Still another object is to provide an improved arrangement of the fuel and air receiver tanks, the tanks being so arranged as to provide an extremely rigid mounting means for the air compressor and its driving engine. These and other objects of the invention will, however, more fully appear in the course of the ensuing description and as more particularly pointed out in the appended claims.

In the accompanying drawing there is shown for purposes of illustration one form which the invention may assume in practice.

In this drawing,—

Fig. 1 is a plan view of the illustrative form of the improved portable compressor unit.

Fig. 2 is a side elevational view of the compressor unit shown in Fig. 1.

Fig. 3 is a rear end elevational view with the upper structure omitted to facilitate illustration.

Fig. 4 is a perspective view showing a portion of the underslung axle mounting structure.

In this illustrative embodiment of the invention there is shown an air compressor unit generally designated 1 of the portable trailer type adapted to be towed from place to place and generally comprising a compressor 2, a compressor driving gas engine 3, an air receiver tank 4, a fuel tank 5 and a wheel axle mounting generally designated 6.

The fuel and air receiver tanks 4 and 5 are, in this instance, arranged in a novel manner in parallel side by side relation on axes extending longitudinally of the compressor unit, and these tanks are maintained in rigid spaced relation, and firmly united by cross-connecting frames 7 and 8. Secured, as by welding, to the forward ends of the tanks 4 and 5 are upstanding angle members 9, 9 having bolted thereto a tow frame 10 of yoke or bail-like shape having an eye 11 adapted for attachment to suitable towing means.

Extending transversely beneath the bottom of the tanks 4 and 5 is the axle structure 6, herein of a commercial design, comprising a tubular member 12 underlying the tanks and having end flanges 13 bolted to depending brackets integral with the cross frame 7 and tank bottoms. Arranged centrally within this tubular member 12 are alined axles having hangers 14 of crank-arm shape supporting stub axles 15 on which wheels 16, 16 are journaled. In this instance, the axles projecting within the tubular member 12 are connected to the latter by torsion rubber springs in the form of tubular rubber blocks arranged in torsional shear and vulcanized to the tube and axles. As the particular type of torsional spring connection between the axles and the tube does not enter into this invention, detailed description and illustration of the same are considered unnecessary.

In accordance with this invention, the compressor 2 and its driving engine 3 are mounted in longitudinal, spaced, balanced relation on the parallel tanks 4 and 5, the latter forming the bottom supporting structure between the compressor and engine and the wheel axle mounting. The frames of the compressor and engine may be welded, bolted or otherwise secured to the tanks, thereby to form a rigid unitary structure. Supported by the yoke-shaped tow frame 10 at the forward ends of the tanks on the side of the compressor opposite from the engine is a radiator 18 of the engine cooling system, while mounted at the rear ends of the tanks is a shield-like frame 19, and the radiator frame and this shield-like frame are adapted to support a removable housing 20 for the compressor and engine. The compressor 2 is of the well known two-cylinder, air-cooled, V-type having its radially located cylinders 21, 21 extending above the tanks, while the cylinder crank case 22 is located down between the tanks, as shown in Fig. 1. Each cylinder is provided with an air intake pipe 23 provided with a usual air cleaner 24, and the compressed air is discharged from the cylinders through a suitable air discharge manifold 25 to a suitable pipe connection leading to the air receiver tank 4.

As a result of this invention, it will be noted that an improved portable compressor unit is provided having a novel arrangement of the fuel and air receiver tanks whereby the tanks provide supporting means for the air compressor and its driving engine whereby an extremely simple, compact and well-balanced unit is obtained. It will further be evident that by mounting the compressor and its driving engine directly on the fuel and air receiving tanks, and by rigidly uniting the parts together, an extremely rigid mounting structure is attained. Further, by the provision of the improved underslug wheel axle mounting, the compressor unit is rendered extremely low in height, it being possible by the provision of the underslung axle mounting to maintain the center of gravity of the unit at a low point. These and other advantages of the improved compressor unit structure will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In an air compressor unit, a pair of fuel and air receiver tanks arranged in parallel side by side relation, cross connecting braces connecting the same, a resilient wheel axle mounting extending transversely beneath said tanks for supporting the latter and mounted upon one of said cross connecting braces, a compressor supported by said tanks, and a compressor driving engine supported by said tanks, said compressor and engine being mounted on said tanks in longitudinal spaced relation respectively at opposite sides of said axle mounting.

2. In an air compressor unit, a pair of fuel and air receiving tanks arranged in rigid parallel side by side relation to form a unitary base structure, an underslung axle mounting extending closely beneath said tanks for supporting the latter and having wheel-supporting arms extending upwardly longitudinally obliquely from its opposite ends, a compressor supported by said tanks, and a compressor driving engine supported by said tanks, said compressor and engine being supported by said tanks in longitudinal spaced balanced relation thereon respectively at opposite sides of said axle mounting.

3. In an air compressor unit, a pair of fuel and air receiving tanks arranged in rigid parallel side by side relation to form a unitary base structure, an underslung axle mounting extending beneath said tanks for supporting the latter, a compressor supported by said tanks, a compressor driving engine supported by said tanks, said compressor and engine being supported by said tanks in longitudinal spaced balanced relation thereon respectively at opposite sides of said axle mounting, a tow frame secured to the forward ends of said tanks, and a radiator for said engine supported by said tow frame.

WIN W. PAGET.